United States Patent [19]
Kumar

[11] Patent Number: 6,163,531
[45] Date of Patent: Dec. 19, 2000

[54] METHOD AND APPARATUS TO THROTTLE CONNECTIONS TO A H.323 MULTIPOINT CONTROLLER BY RECEIVER TERMINALS IN A LOOSELY-COUPLED CONFERENCE

[75] Inventor: Vineet Kumar, Beaverton, Oreg.

[73] Assignee: Intel Corporation, Santa Clara, Calif.

[21] Appl. No.: 08/961,722

[22] Filed: Oct. 31, 1997

[51] Int. Cl.[7] .............................. H04L 12/16; H04Q 11/00
[52] U.S. Cl. ............................................. 370/260; 370/401
[58] Field of Search ..................................... 370/260, 230, 370/235, 259, 261–266, 351, 352, 354, 356, 360, 392, 396, 401, 402, 420, 422, 252, 270, 285, 299, 353, 355, 357, 398, 400

[56] References Cited

U.S. PATENT DOCUMENTS

| | | | |
|---|---|---|---|
| 5,600,646 | 2/1997 | Polomski | 370/263 |
| 5,729,684 | 3/1998 | Kuzma | 709/204 |
| 5,742,772 | 4/1998 | Sreenan | 709/226 |
| 5,764,750 | 6/1998 | Chau et al. . | |
| 5,867,494 | 2/1999 | Krishnaswamy et al. . | |
| 5,867,653 | 2/1999 | Aras et al. | 709/204 |
| 5,909,431 | 6/1999 | Kuthyar et al. | 370/260 |
| 5,922,047 | 7/1999 | Newlin et al. | 709/217 |
| 5,963,547 | 10/1999 | O'Neil et al. | 370/260 |

OTHER PUBLICATIONS

ITU–T Recommendation H.323, "Packet–Based Multimedia Communications Systems", Version 1, Published Nov. 1996, pp. 1–120.

*Primary Examiner*—Douglas W. Olms
*Assistant Examiner*—Phirin Sam
*Attorney, Agent, or Firm*—Blakely, Sokoloff, Taylor & Zafman LLP

[57] ABSTRACT

The present invention is a method of throttling connections to a multipoint controller in a loosely-coupled conference. The loosely-coupled conference includes at least one receiver terminal and a H.323 panel having a multipoint controller and one or more H.323 terminals coupled to the multipoint controller and each to transmit and receive media streams on a multicast address. The method includes the steps of receiving a callable address of a receiver terminal on the multicast address, determining whether sufficient resources are available to allow the receiver terminal to join the panel, and connecting to the receiver terminal using the callable address and allowing the receiver terminal to join the H.323 panel and transmit and receive media streams on the multicast address if sufficient resources are available.

20 Claims, 9 Drawing Sheets

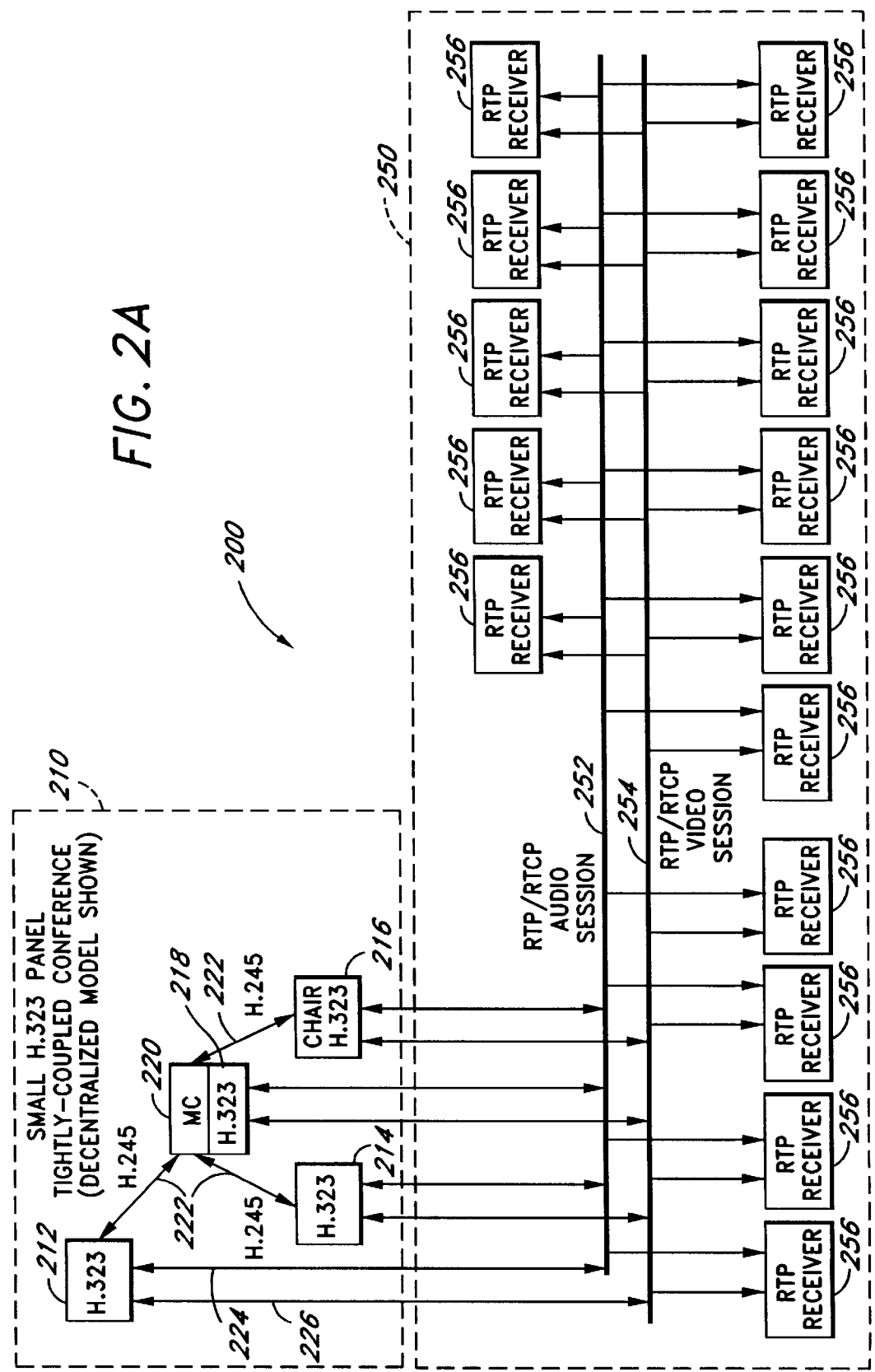

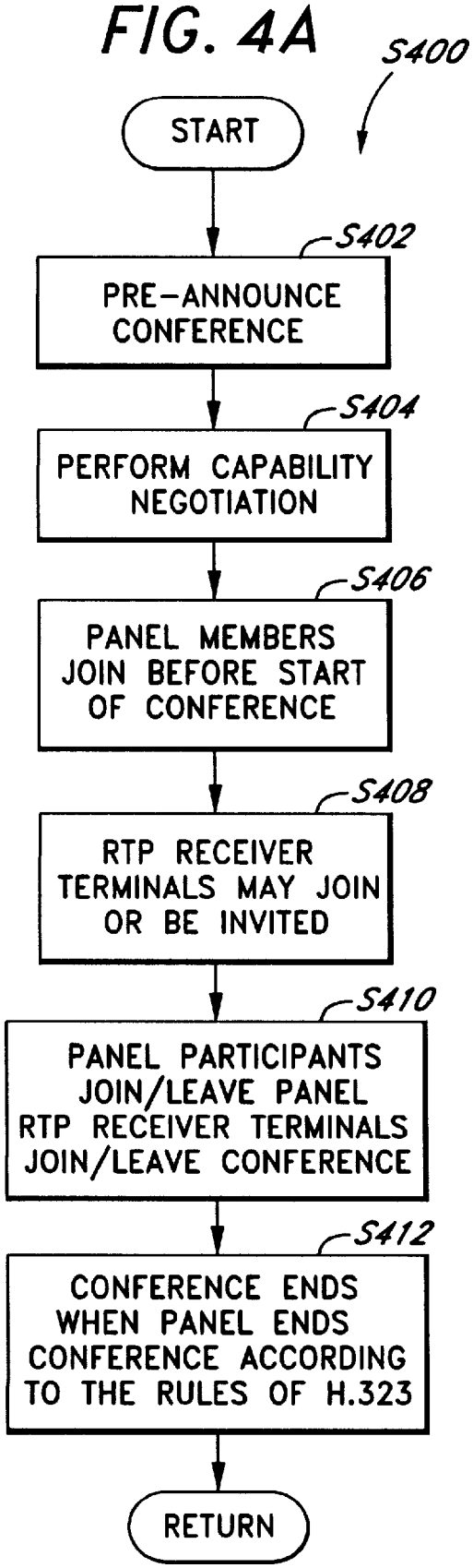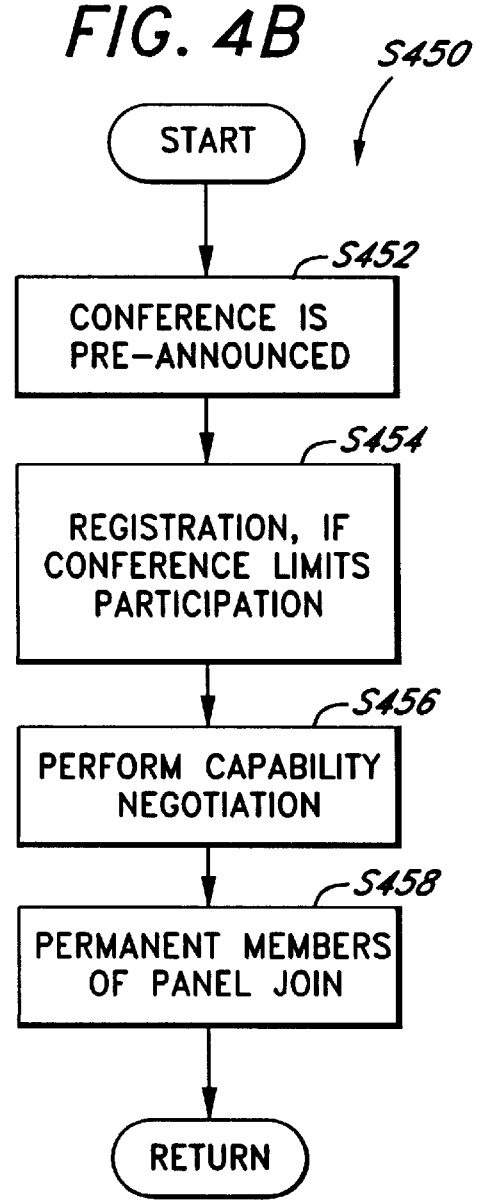

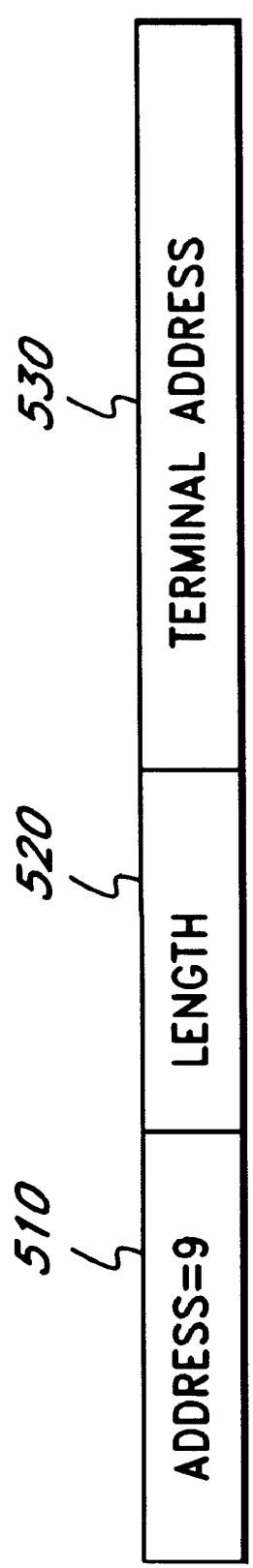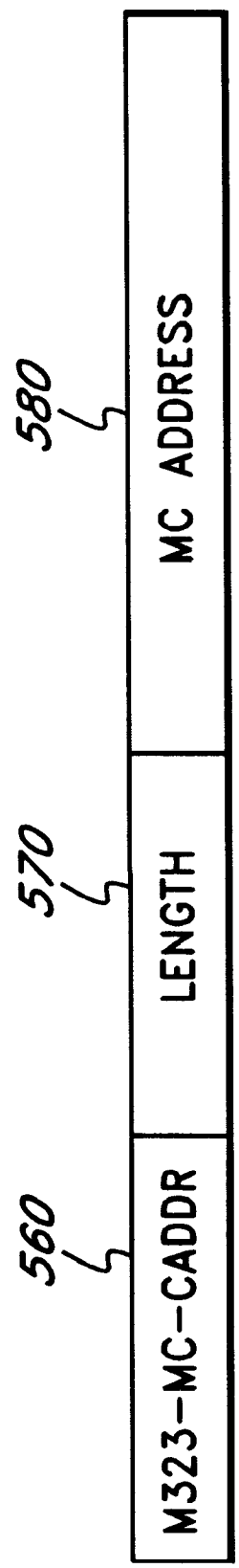

FIG. 6

- 602 — v=0
- 604 — o=vkumar f81d4fae-7dec-11d0-a765-00a0c91e6bf6 1 IN IP4
- 614 — 134.134.157.81
- 616 — s=Discussion on Enviromental Pollution
- 618 — t=<3034423619> 0
- 622 — r=7d 1h 0
- 628 — m=audio 5004 RTP/AVP 120
- 636 — c=IN IP4 228.2.1.1/63
- 644 — b=9.8
- 646 — a=rtpmap:120 G729/8000
- 650 — a=sendrecv

```
v=0
o=vkumar f81d4fae-7a13-11d0-a7bc-00a0c91e6bf6 1 IN IP4
134.134.157.81
s=cs 506: In-depth study of Video Conferencing Architecture,
  Hardware, and Software
u=http://www.university.edu/cs506        ← 702
t=4921749382 8311296431
r=7d 1h 0 48h 48h
k=http://www.university.edu/cs/registration.html   ← 704
a=type:HLC   ← 706 m=control 1720 H323 caps   ← 710
c=IN IP4 134.134.157.81    ← 712 m=audio 5004 RTP/AVP 4     ← 716
i=Audio in English          ← 718
c=IN IP4 224.2.1.1/127      ← 720
b=5.6                       ← 722
a=recvonly                  ← 724 m=audio 5006 RTP/AVP 4
i=Audio in Hindi
c=IN IP4 224.60.1.1/127
b=5.6
a=recvonly m=video 5008 RTP/AVP 100    ← 730
c=IN IP4 224.40.1.1/127     ← 732
b=16                        ← 734
a=rtpmap: 100 H263/90000    ← 736
a=recvonly                  ← 738
```

```
v=0
o=vkumar f81d4fae-7a13-11d0-a7bc-00a0c91e6bf6 2 IN IP4
134.134.157.81
s=cs 506: In-depth study of Video Conferencing Architecture,
Hardware, and Software
u=http://www.university.edu/cs506
t=4921749382 8311296431
r=7d 1h 0 48h 48h
k=base64: des:a1AB0739hqiHC7Td283==BA          ⟵ 802
a=type:HLC
  ⎧ m=control 1720 H323 mc    ⟵ 806
  ⎨ c=IN IP4 134.134.157.81   ⟵ 808
804 m=audio 5004 RTP/AVP 4
i=Audio in English
c=IN IP4 224.2.1.1/127
b=5.6
a=recvonly m=audio 5006 RTP/AVP 4
i=Audio in Hindi
c=IN IP4 224.60.1.1/127
b=5.6
a=recvonly m=video 5008 RTP/AVP 100
c=IN IP4 224.40.1.1/127
b=16
a=rtpmap: 100 H263/90000
a=recvonly
```

800

6,163,531

METHOD AND APPARATUS TO THROTTLE CONNECTIONS TO A H.323 MULTIPOINT CONTROLLER BY RECEIVER TERMINALS IN A LOOSELY-COUPLED CONFERENCE

BACKGROUND OF THE INVENTION

1. Field of the Invention

The present invention relates generally to the field of multimedia communication, and specifically, to a method and apparatus for throttling connections to a H.323 multipoint controller by receiver terminals in a loosely-coupled conference.

2. Description of Related Art

Recommendation H.323, entitled "Visual Telephone Systems and Equipment for Local Area Networks Which Provide a Non-guaranteed Quality of Service", (version 1, published November 1996), describes terminals, equipment, and services for multimedia communication over local area networks ("LANs") and wide area networks ("WANs"). In particular, terminals compatible with Recommendation H.323 ("H.323 terminals") carry real-time voice, data, video, or any combination thereof including video telephony over a network (e.g., Internet). However, H.323 is limited in scalability due to the requirements for tightly-coupled conferencing. That is, H.323 requires that all participants in a conference be known in addition to a set of procedures for conference setup, capability negotiation, creation and control of audio/video/data streams, and conference tear down, all of which account for overhead. A central multipoint controller ("MC") is used for the aforementioned procedures. Such a procedure for conference setup and capability negotiation at the start of the conference, though essential for tightly-coupled conferences, is cumbersome and impractical for conferences involving an arbitrarily large number of participants. Potentially hundreds or thousands of receiver terminals can simultaneously attempt to connect to the MC. The MC allows a limited number of connection based on resources (i.e., memory, processing power, etc.) available for the conference. Some of the receiver terminals will successfully connect while others will unsuccessfully try to connect repeatedly, thereby congesting the MC.

Accordingly, there is a need in the art for a method and apparatus to throttle connections to a H.323 multipoint controller by receiver terminals in a loosely-coupled conference involving hundreds and thousands of participants.

SUMMARY OF THE INVENTION

The present invention is a method of throttling connections to a multipoint controller in a loosely-coupled conference. The loosely-coupled conference includes at least one receiver terminal and a H.323 panel having a multipoint controller and one or more H.323 terminals coupled to the multipoint controller and each to transmit and receive media streams on a multicast address. The method includes the steps of receiving a callable address of a receiver terminal on the multicast address, determining whether sufficient resources are available to allow the receiver terminal to join the panel, and connecting to the receiver terminal using the callable address and allowing the receiver terminal to join the H.323 panel and transmit and receive media streams on the multicast address if sufficient resources are available.

BRIEF DESCRIPTION OF THE DRAWINGS

The features and advantages of the present invention will become apparent from the following detailed description of the present invention in which:

FIG. 2A illustrates a first exemplary system of the present invention.

FIG. 4A is a flow diagram illustrating an exemplary sequence of events in a loosely-coupled conference.

FIG. 4B is a flow diagram illustrating an exemplary process for establishing a conference.

FIG. 5A illustrates an exemplary format of a callable address in accordance with the teaching of the present invention.

FIG. 5B illustrates an exemplary format of a MC address in accordance with the teaching of the present invention.

FIG. 6 illustrates an exemplary SDP announcement of the present invention.

FIG. 7 illustrates a second exemplary SDP announcement of the present invention.

FIG. 8 illustrates an exemplary private announcement of the present invention.

DESCRIPTION OF THE PREFERRED EMBODIMENT

The present invention relates to a method and apparatus to throttle connections to a multipoint controller in a loosely-coupled conference potentially involving hundreds and thousands of participants. In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention unnecessarily.

The present invention works within the framework of Recommendation H.323 (ITU-T Recommendation H.323 (version 1, published November 1996): "Visual Telephone Systems and Equipment for Local Area Networks Which Provide a Non-guaranteed Quality of Service"), the contents of which is incorporated by reference. However, the present invention provides scalability well beyond the limits of H.323 to enable applications involving hundreds and thousands of participants. Any reference made to recommendation H.323 also may refer to its companion recommendation, ITU-T Recommendation H.225.0 (1996), entitled "Media Stream Packetization and Synchronization for Visual Telephone Systems on Non-Guaranteed Quality of Service LANs".

As hereinafter described, a H.332 transmitter/receiver terminal and a H.323 terminal refer to a terminal that can generate and/or terminate audio, video, and/or data streams in any combination (hereinafter referred to as "media streams") for multimedia communication over, for example, packet-based networks. A RTP receiver terminal and a H.332 receiver terminal refer to a terminal that can only terminate media streams. Thus, a H.332 terminal has the capabilities of a H.323 terminal when within a H.323 panel (called a H.332 transmitter/receiver) and the capabilities of a RTP receiver terminal when outside the H.323 panel (called a H.332 receiver). H.332 terminals may be integrated into computers (e.g., desktop, laptop, palmtop, etc.) or implemented as stand-alone devices (e.g., videotelephones, televisions, etc.). Moreover, a gateway is a device that provides the appropriate conversion between different network types. In a loosely-coupled conference (also referred to as a H.332 conference), a session (e.g., an audio session) is defined as a multicast address having a real-time transport protocol ("RTP") port and a real-time transport control protocol ("RTCP") port.

Figure 1:
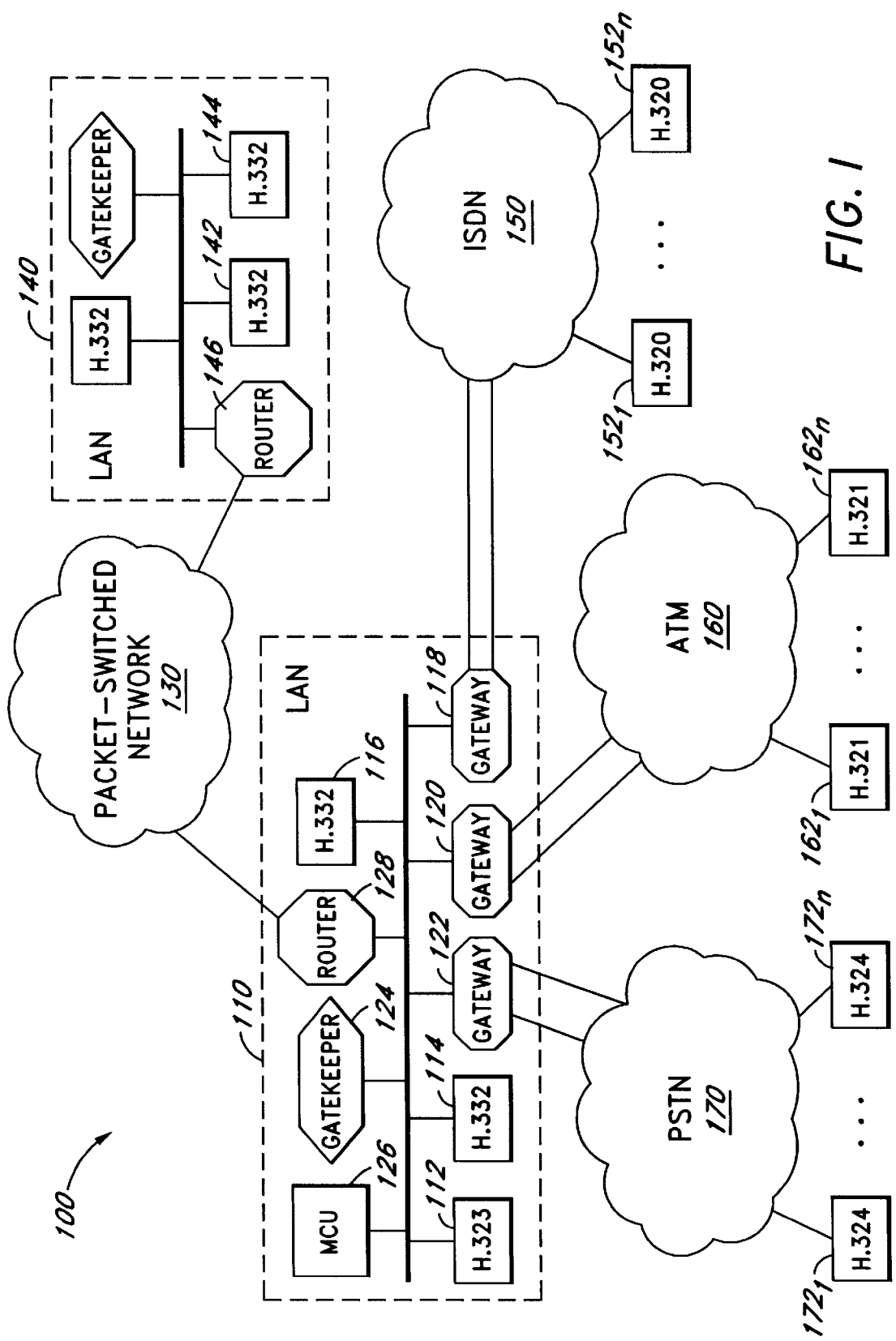
FIG. 1 illustrates an exemplary scope of the present invention.

FIG. 1 illustrates an exemplary scope of the present invention. Referring to FIG. 1, a system 100 shows a number of exemplary means for establishing communication in a loosely-coupled conference. The system 100 includes a plurality of terminals (e.g., H.323 terminal 112 and H.332 terminals 114 and 116) coupled together in a network 110 such as a local area network ("LAN"). Each terminal in the network 110 may interwork with H.320 terminals $152_1$–$152_N$ over integrated services digital network ("ISDN") 150 via gateway 118, H.321 terminals $162_1$–$162_M$ over asynchronous transfer mode ("ATM") network 160 via gateway 120, and H.324 terminals $172_1$–$172_P$ over packet-switched telephone network ("PSTN") 170 via gateway 122, where M, N, and P are positive whole numbers.

Additionally, each terminal in the network 110 may interwork with similar terminals on a second network 140 by way of a packet switched network 130 via routers 128 and 146. A gatekeeper such as gatekeeper 124 provides control access to and bandwidth management over network 110. A multipoint controller ("MC") may be located in a terminal, gateway, gatekeeper, or provided as a stand-alone unit, in which case it is called a multipoint control unit ("MCU") such as MCU 126. A MCU includes a MC and zero or more multipoint processors ("MPs"). The MC provides control functions for a conference while the MP receives media streams from the terminals, processes the media streams, and returns them to the terminals in the conference. In one embodiment, the bandwidth of the system 100 may span, for example, from low speed modem links of 14.4 Kb/s (e.g., over PSTN 170) to high speed links of 622 Mb/s (e.g., over ISDN 150). Layered video may be provided to accommodate participants at different bandwidth links and their need for varying picture quality.

FIG. 2A illustrates a first exemplary system 200 of the present invention. Referring to FIG. 2A, the system 200 is a loosely-coupled conference and includes a small H.323 panel 210 and a large group 250 of RTP receiver terminals 256. Within the panel 210, full interaction is allowed between terminals 212, 214, 216, and 218 either through social or automatic control. In social control everyone in the panel can potentially talk and transmit their audio and video on the RTP/RTCP audio and video sessions 252 and 254. Automatic control, on the other hand, is through H.323 chair-control. H.323 chair-control gives special privileges to the chair. Any panel member who wants to transmit his audio and/or video must first request the floor from the chair. When the floor is granted by the chair, the participant can use the RTP/RTCP audio and video sessions 252 and 254.

Moreover, within the panel 210, any type of H.323 model may be used (i.e., centralized, decentralized, hybrid, etc.). In a decentralized model, as shown in FIG. 2A, each terminal within the panel 210 communicates with a MC 220 in a point-to-point manner on the H.245 control channel 222 (ITU-T Recommendation H.245 (1997), entitled "Control of Communications Between Visual Telephone Systems and Terminal Equipment"). In the exemplary embodiment of FIG. 2A, the MC 220 is located within the H.323 terminal 218. It must be noted, however, that this is not intended as a restriction of the present invention. Moreover, each terminal within the panel 210 multicasts its own audio and video 224 and 226 channels in the RTP/RTCP audio and video sessions 252 and 254, respectively, to all other terminals within the panel 210 and a plurality of RTP receiver terminals 256 in the large group 250. The MC 220 may control which terminal or terminals within the panel 210 are actively multicasting audio and/or video. Each terminal (within and outside the panel 210) receives the multicast video channels on the RTP/RTCP video session 254 and selects one or more of the available channels for display to the user. In addition, each terminal (within and outside the panel 210) receives the multicast audio channels on the RTP/RTCP audio session 252 and performs an audio mixing function in order to present a composite audio signal to the user.

Figure 2B:
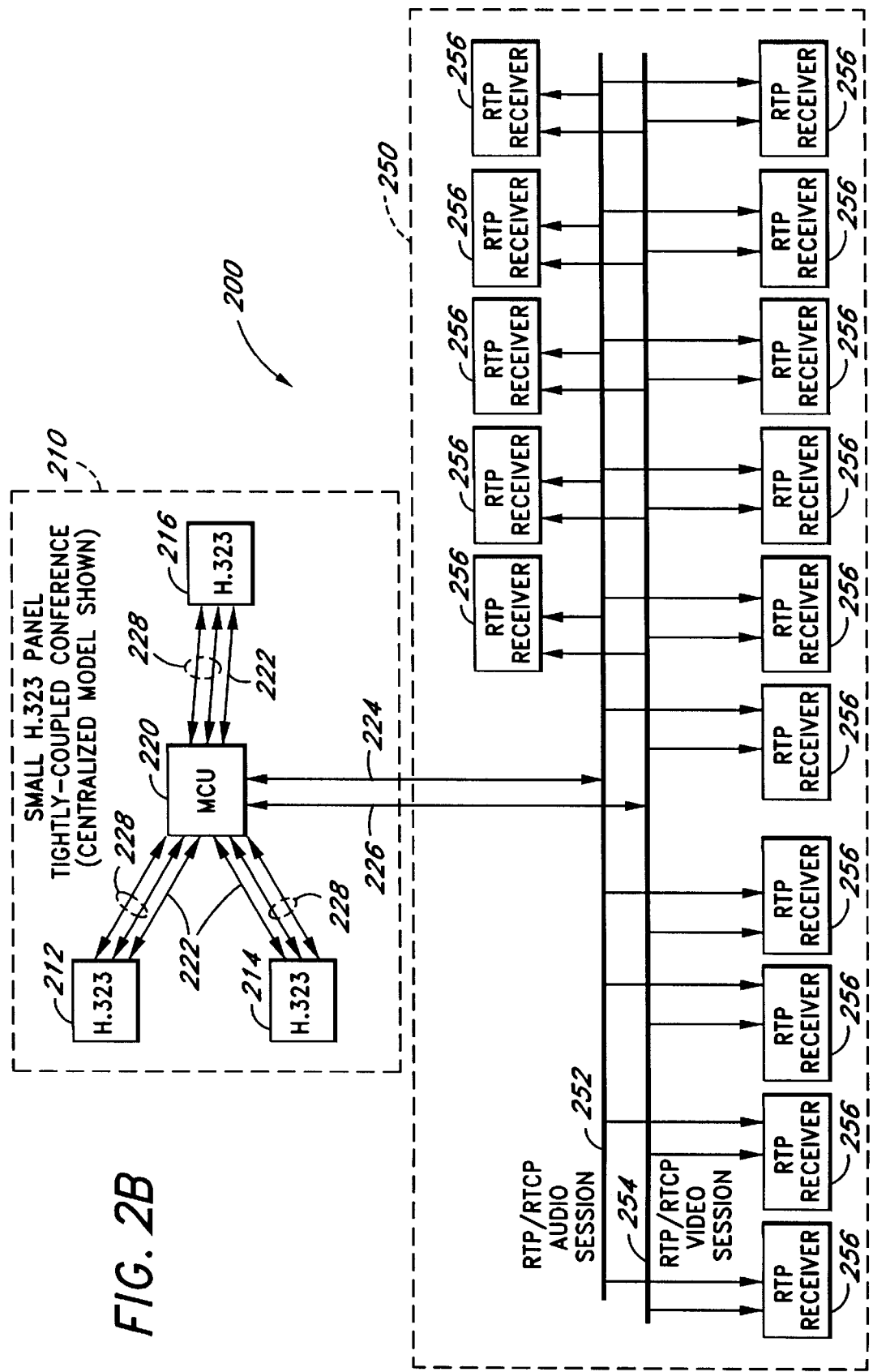
FIG. 2B illustrates a second exemplary system of the present invention.

In a centralized model, as shown in FIG. 2B, terminals within the panel 210 communicate with a MC of the MCU 220 in a point-to-point manner on the H.245 control channel 222 and also with a MP of the MCU 220 in a point-to-point manner on the audio and video channels 228. The MP performs video switching or mixing, audio mixing, and transmits the resulting media streams back to all terminals (i.e., centralized). In addition, the MP of the MCU 220 multicasts the resulting audio and video streams on the RTP/RTCP audio and video sessions 252 and 254, respectively.

Through the use of RTP and RTCP the present invention scales to potentially thousands of participant. The contents of RTP and RTCP are described in the Recommendation H.225.0 and hereinafter incorporated by reference. As can be seen from FIGS. 2A and 2B, the large group 250 includes the plurality of RTP receiver terminals 256. These RTP receiver terminals 256 include external means to connect to the conference (i.e., RTP/RTCP audio and video sessions 252 and 254) and receive media streams of any terminal within the panel 210. However, the RTP receiver terminals 256 are passive and are not allowed to interact with the conference. If they wish to interact, they have to join the panel or get invited by the panel (as described below). Outside the panel 210 multicast is used on the audio and video sessions 252 and 254 to provide scalability to the RTP receiver terminals 256. This can be achieved either by using the H.323 decentralized model as shown in FIG. 2A, or, when the centralized model is used (FIG. 2B), by using a MP to multicast media streams on the RTP audio and video sessions 252 and 254, respectively, to the RTP receiver terminals 256. Moreover, through RTCP messages, the identity of each participant in the conference is known over a period of time.

The terminals inside the panel 210 include permanent and temporary members and the number of terminals is limited in size only by the amount of resources available by the MC of FIG. 2A or the MCU of FIG. 2B for the conference. The permanent members are those who are essential to the conference such as, but not limited to, a teacher in a distance learning virtual class or a presenter in a virtual auditorium full of people. The temporary members are the RTP receiver terminals 256 who have joined the panel to fully interact within the conference by transmitting media streams on the RTP/RTCP audio and video sessions 252 and 254 (e.g., a student who has joined the panel to ask a question). Temporary members within the panel 210 change with time as new members join and old members leave voluntarily or are requested to leave to make room for new ones. The difference between a H.323 terminal and a H.332 terminal is that a H.332 terminal has the capabilities of becoming a RTP receiver terminal when it leaves the panel whereas when a H.323 terminal leaves the panel, it is disconnected from the conference.

Figure 3:
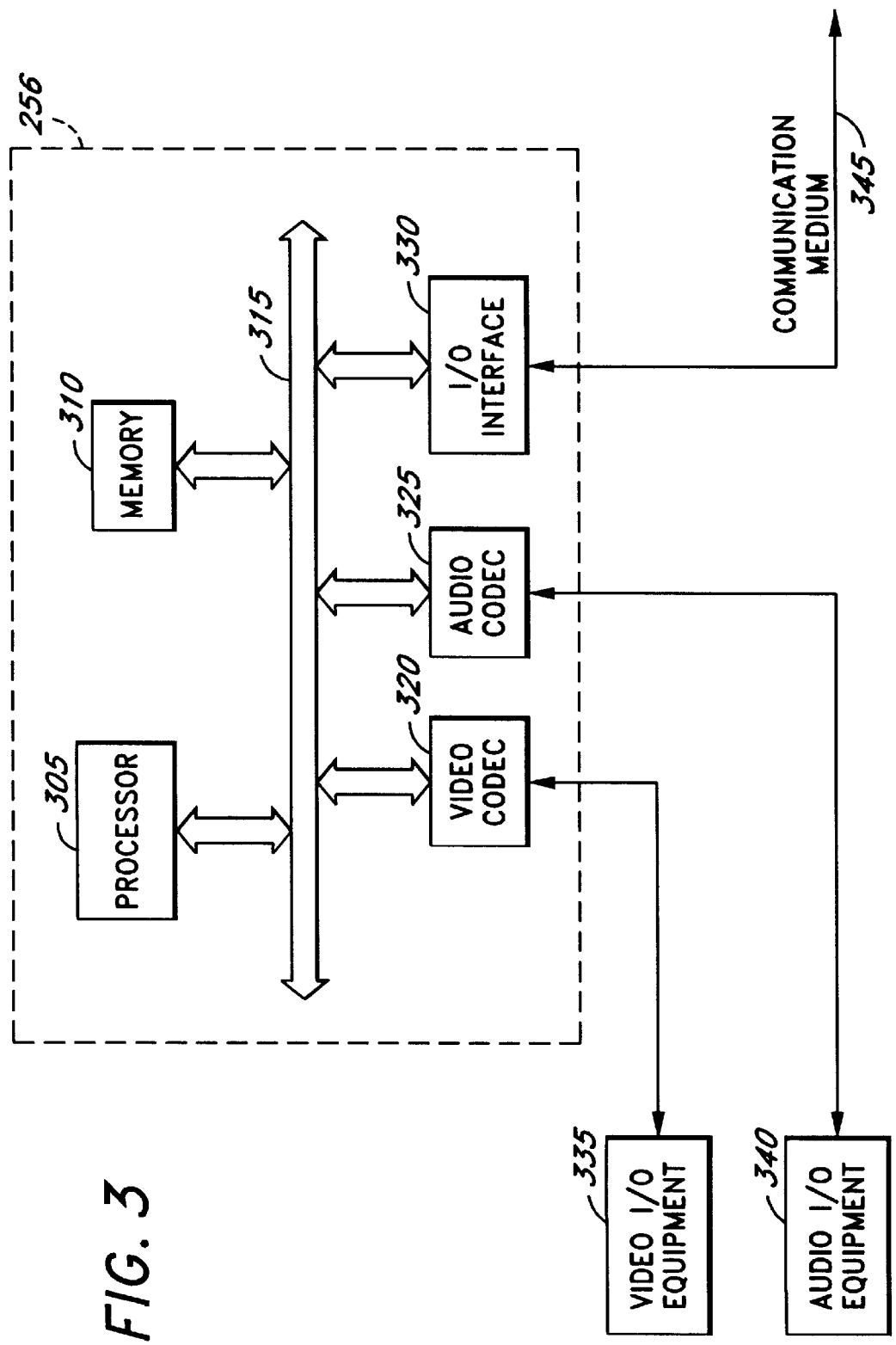
FIG. 3 is a block diagram illustrating an exemplary embodiment of a receiver terminal of FIGS. 2A and 2B.

FIG. 3 is a block diagram illustrating an exemplary embodiment of a receiver terminal 256 of FIGS. 2A and 2B. Referring to FIG. 3, the receiver terminal 256 includes a processor/controller 305 coupled to a memory device 310 (e.g., random access memory, "RAM", read only memory, "ROM", etc.) by way of a bus 315. The receiver terminal 256 further includes, among other things, a video codec 320 (e.g., H.261, H.263, etc.) for coupling to video input/output ("I/O") equipment 335 (e.g., camera, monitor, etc.), an audio codec 325 (e.g., G.711, G.7212, G.729, etc.) for coupling to audio I/O equipment 340 (e.g., microphone, speaker, mixer, etc.), and an I/O interface 330 (e.g., serial/parallel port and modem, network interface card, etc.) for communicating over a communication medium 345 (e.g., telephone line, ethernet connection, etc.). The memory device 310 includes instructions under software control to be executed by the processor/controller 305 to connect to a multicast address and receive media streams, to connect to a MC and join the H.323 panel for transmitting and receiving media streams, and to leave the H.323 panel and simultaneously receive media streams on the multicast address without disconnecting from the conference. It must be noted, however, that the specific RTP receiver terminal architecture shown in FIG. 3 is an exemplary embodiment and not critical in practicing the present invention.

FIG. 4A is a flow diagram illustrating an exemplary sequence of events in a loosely-coupled conference. Referring to FIG. 4A, the process S400 begins at Step S402 where a conference is pre-announced with sufficient information to enable discovery and participation. In one embodiment, an Internet Engineering Task Force ("IETF") Session Description Protocol ("SDP") is used to encode the conference announcement (see, e.g., FIG. 6). In particular, SDP defines how information is specified in a conference. However, any other mechanism may be used to carry the announcement such as by way of electronic mail ("SMTP"), the Internet (HyperText Transfer Protocol, "HTTP"), and Session Announcement Protocol ("SAP"). Participation in the conference may be limited for security, registration, and/or monetary purposes (e.g., a college class). In such a case, the public announcement will typically contain information on how to register and obtain a private announcement with encryption key(s), algorithm(s), and any other private information (see, e.g., FIGS. 7 and 8).

At Step S404, capability negotiation is performed by one or more RTP receiver terminals, typically prior to the conference, in order to determine whether the MC supports the capabilities of the one or more RTP receiver terminals. If capabilities change prior to the start of the conference, a new announcement is created and transmitted. Even though the capabilities of the conference have been determined prior to the conference, the panel may change the capabilities during the conference. However, changing capabilities during the conference may force one or more RTP receiver terminals out of the conference because of the mismatch or non-compatibility in capabilities. At Step S406, before the start of the conference, permanent members of the panel either join or are invited according to the rules of H.323. At Step S408, when the conference commences, RTP receiver terminals may either join the panel or be invited by the panel to participate as temporary panel members. At Step S410, the panel participants join and/or leave the H.323 panel according to the rules of H.323 and the RTP receiver terminals join and/or leave the conference according to the rules of RTP/RTCP. At Step S412, the loosely-coupled conference ends when the H.323 panel ends the conference according to the procedures of H.323.

As discussed above in one embodiment, SDP is used to encode the conference announcement. However, since SDP does not provide all the information needed to encode an announcement for a loosely-coupled conference, the present invention extends SDP using the guidelines for extensions specified in SDP as follows:

a=type:<conference type>.

This record specifies the type of the conference. In one embodiment, values in the SDP specification are "broadcast", "meeting", and "moderated". With the present invention, a new value, "HLC", is added to specify that the type of the conference is a H.332 loosely-coupled conference. The default for RTP receiver terminals in a loosely-coupled conference is to receive only. As such, this record is present in SDP announcements to allow an SDP parser to determine if the announcement is for a loosely-coupled conference.

The following record in SDP specifies the media announcements:

m=<media> <port> <transport> <format list>.

The first sub-field is the media type and values in the SDP specification are "audio", "video", "whiteboard", "text", and "data". With the present invention, "control" is added to specify an external control (e.g., H.323) for capability negotiation. The second sub-field is the transport port to which the control applies. If the call-signaling address of a MC or a capability negotiation server is provided in the connection record, the transport port is the call-signaling port of H.323. The third sub-field is the transport protocol. With the present invention, a new value, "H323", is added to specify that the procedures of H.323 will be used for control. The present invention added a new sub-field which is the media format. Two values are added, namely, "mc" and "caps" to specify a MC or a capability negotiation server, respectively.

A capability negotiation server may allow clients to negotiate their capabilities required to access the conference. If a client is allowed to negotiate its capabilities with the server, the call-signaling address of the capability negotiation server is provided in the connection "c" record, as defined in SDP. If the capabilities change as a result of the negotiation, a new announcement is made. If the RTP receiver terminals are allowed to join the panel during the conference, the call-signaling address of the MC is provided in the connection "c" record. The capability negotiation server and the MC may be the same machine in which case they will have the same address. By way of example, the following two SDP records specify the call-signaling address of a capability negotiation server:

m=control 1720 H323 caps c=IN IP4 134.134.157.81.

By way of another example, the following two SDP records specify the call-signaling address of a MC:

m=control 1720 H323 mc c=IN IP4 134.134.157.81.

The SDP "origin" record, "o=<username> <session id> <version> <network type> <address type> <address>", contains a session identifier field which is text based. This field contains any printable 8 bit international standard organization ("ISO") 8859-1 character with the exception of 0x0a (newline) and 0x0d (carriage return). The conference identification ("CID") of H.323 is used in the session identifier field. The SDP parser considers the session identifier field as the CID when the announcement is for a loosely-coupled conference as specified in the "a=callType: HLC" record. The CID is in universally unique identifier ("UUID") form. Recommendation H.323 describes the method for creating a CID.

RTP sessions are receive-only (a=recvonly) for the RTP receiver terminals unless explicitly specified otherwise. The RTP receiver terminals do not transmit media streams on these RTP sessions until they join the panel and follow the procedures of H.323 to determine when they are allowed to transmit media streams.

FIG. 4B is a flow diagram illustrating an exemplary process S450 for establishing a conference. The process commences at Step S452, where the conference is pre-announced with sufficient information to enable discovery of and participation in the conference. As discussed above in the preferred embodiment, SDP is used to encode the announcement. Even though the announcement is directed to all terminals, both inside and outside of the panel, the announcement is written from the perspective of RTP receiver terminals due to the fact that such terminals do not have access to the H.245 control channel during the conference.

In one preferred embodiment, the announcement includes the following information: (1) conference identification; (2) conference start and stop times; (3) mode of each RTP and data sessions, which include the media type (video, audio, data, etc.), the coder (G.723.1, H.263, etc.), etc.; (4) information on how to register and obtain an encryption key(s), algorithm(s) addresses, and ports for each RTP session; (5) a web site uniform resource locator ("URL") to provide more information on the conference, such as slides for downloading, documents, payment method, etc.; (6) address of the capability negotiation server; and, (7) a MC address to provide a back-channel to the RTP receiver terminals. The SDP announcement further includes information so that non-H.323 terminals, which are SDP and RTP/RTCP compliant, can join the loosely-coupled conference as RTP receiver terminals. Such non-RTP receiver terminals ignore extended SDP attributes that are not understood. However, non-H.323 terminals will not be able to join the panel.

At Step S454, if the conference limits participation, the announcement includes information on how to register and obtain a private announcement. In one embodiment, the conference is limited to registered participants, in which case the media streams may be encrypted. A public announcement contains information on how to register and obtain a private announcement. It is up to the conference announcer to determine how much information is revealed in the public announcement. For example, the MC address may not be revealed in the public announcement. The private announcement may include all the information about the conference including the encryption key(s) and algorithm(s) as well as the public announcement fields. The user accesses the URL to perform the necessary registration. After registration, the user is sent a private announcement on a secure channel (e.g., on a secure HTTP session or via a secure e-mail). The private announcement contains the key(s) required to decipher the streams, along with the name of the encryption algorithm(s) used and the mode(s) of operation.

At Step S456, capability negotiation is performed. The RTP receiver terminals perform capability negotiation if the announcement provides the address of the capability negotiation server. The capability negotiation server may also be the MC of the announced conference. In the preferred embodiment, the procedures outlined in H.323 are followed. At Step S458, the permanent members of the panel either join or are invited to the panel before the start of the conference. The procedures outlined in H.323 is used to invite permanent members of the panel at the conference start time. Similarly, permanent members can also join the conference at the conference start time by following the procedures outlined in H.323. The process S450 then ends when the conference is established.

During the conference, RTP receiver terminals are usually passive; they can only receive media streams. All RTP receiver terminals must comply with the requirements of RTP/RTCP and SDP. If a RTP receiver terminal wants a back-channel to ask questions or become part of the panel discussion, it must either join the panel or get invited by the panel. Once the RTP receiver terminal joins the panel, it becomes a H.332 transmitter/receiver terminal and participates according to the rules of the panel and must comply with the requirements of H.323. When a terminal leaves the panel, it becomes a RTP receiver terminal again. Because the panel is limited in size, usually due to the resource constraints of the MC, only a small subset of RTP receiver terminals will be able to join the panel at any one time. Other RTP receiver terminals must wait for their turn.

In order to join the panel, the RTP receiver terminals need to know the address of the MC. In one embodiment, the conference announcement provides the MC address if the terminals are allowed to join the panel. Each terminal in the conference periodically transmits its user's real name in the RTCP source description ("SDES") item NAME which enables the MC and each terminal to build up a roster over a period of time. Each RTP receiver terminal further transmits its callable address in a RTCP SDES item H323-CADDR which allows the panel to invite the RTP receiver terminal.

Typically three RTCP SDES items are transmitted in a RTCP interval, namely, CNAME ("canonical name"), H323-CADDR, and NAME. In one embodiment, CNAME is transmitted every RTCP interval. One extra SDES item is sent at least every third interval. The extra items are NAME and H323-CADDR. Both NAME and H323-CADDR, are sent at least every sixth interval. Note that with the use of a Null H323-CADDR, the frequency of NAME can be increased.

Before leaving a RTP session, all terminals must send a RTCP BYE to allow terminals in the conference to update their rosters immediately. Moreover, each H.323 terminal in the panel must comply with the H.245 procedures by closing logical channels for that RTP session.

RTP receiver terminals must use the SDES item H323-CADDR, as shown in FIG. 5A, to provide the complete callable address of the user. This allows the panel to invite any RTP receiver terminal. The SDES item H323-CADDR is H.332 application specific and will not be implemented by non-H.332 terminals. H.332 terminals that cannot provide a callable address, primarily due to being inside of a certain firewall, will not use H323-CADDR. Consequently, terminals that do not provide H323-CADDR cannot be invited to the panel.

Referring to FIG. 5A, the SDES item H323-CADDR includes a first portion 510 which, in one embodiment, comprises 8 bits and specifies a constant (e.g., 9) as the SDES item for the callable address and a second portion 520 which specifies the length (e.g., 8 bits) in bytes of the terminal's callable address field. If the length is equal to zero, then the CNAME has the valid address. The Null H323-CADDR is preferred since it saves bytes that can be used to send other SDES items more frequently. The SDES item further includes a third portion 530 (typically less than 256 bytes) which specifies the complete callable address of the user. The form of the address depends on whether the user terminal has a firewall. In one embodiment, if the firewall is not present or is transparent, then the user terminal has the form "user@terminal" or "terminal". The user name "user" is typically the login name (e.g., jdoe) rather than the personal name (e.g., John Doe). The terminal name "terminal" is either the fully qualified domain name of the host or the standard ASCII representation of the terminal numeric address (e.g., 134.134.157.81). For a multi-user terminal, the Setup message from the panel contains the user name in the "destinationAddress" field.

FIG. 5B illustrates an exemplary format of a MC address in accordance with the teaching of the present invention. Referring to FIG. 5B, the format of the SDES item H323-MC-CADDR includes a first portion 560 which, in one embodiment, comprises a constant which specifies that the SDES item is the address of the MC and a second portion 570 which specifies the length in bytes of the MC address. A third portion 580 of the SDES item specifies the complete address of the MC. In one embodiment, the MC transmits a Null H323-MC-CADDR when it does not have sufficient resources (or is substantially devoid of resources) to allow more terminals to join the H.323 panel.

To join the panel, the RTP receiver terminals retrieve the address of the MC from the SDP announcement. The MC may also transmit its address on the multicast RTP/RTCP audio and video session as an SDES item. The RTP receiver terminals then follow the procedures of H.323 to join the panel. If the MC address is not advertised in the SDP announcement or is not otherwise provided, the RTP receiver terminals are not allowed to join the panel and, in such case, they may only be invited to the panel. If the MC address is known to all the RTP receiver terminals, there is a possibility that a large number of RTP receiver terminals will try to join the panel and congest the MC. To avoid this potential problem, the MC may employ a mechanism to throttle connections to the MC by regulating the connections from the RTP receiver terminals.

One method of throttling connections to the MC is for the MC to simply not transmit its address, in which case the RTP receiver terminals can join the panel only by invitation. The RTP receiver terminals periodically transmit their callable address which allows the MC to invite one or more of them. A second method of throttling connections to the MC is by the MC advertising its address when it has sufficient resources (i.e., memory, processing power, etc.) to handle more terminals in the panel and advertising an invalid or Null address when it does not have sufficient resources to handle more terminals in the panel. In this case, the RTP receiver terminals connect to the MC only if the last address advertised by the MC was valid.

Once a RTP receiver terminal has joined the panel it can stay until it decides to leave or until the MC terminates its H.323 call. The MC allows a limited number of connections based on the amount of resources allocated for the panel. When the resources have been exhausted and some RTP receiver terminal want to join the panel, the MC may drop some temporary panel member. The dropped member shall leave the panel by following the procedures of H.323. After being dropped, the temporary panel member becomes a RTP receiver terminal.

FIG. 6 illustrates an exemplary SDP announcement of the present invention. Referring to FIG. 6, the announcement 600 is an example of a RTP/RTCP audio conference which uses social control. In particular, the announcement 600 includes: (i) record "v" which specifies the version of SDP (field 602); (ii) record "o" which specifies the login name of the originator (field 604), the UUID of the conference (field 606), the version of the announcement (field 608), the network type of the host (field 610) (e.g., Internet), the address type of the host (field 612), and the IP address of the originator (field 614); (iii) record "s" which specifies the name of the conference (field 616); (iv) record "t" which specifies the start time of the conference (field 618), the end time of the conference (field 620) (an end time of 0 implies that the conference never ends); (v) record "r" which specifies the periodicity of the conference (field 622), the duration of the conference (field 624), and an offset time from the start time of the conference (field 626); (vi) record "m" which specifies the media type (field 628) (e.g., an audio RTP session), the RTP port (field 630) (e.g., 5004), the implied RTCP port (e.g., 5005), whether an audio video profile is used (field 632), and a dynamic payload type (field 634); record "c" which specifies the network type (field 636), the address type (field 638), a multicast address for the media connection (field 640), and a time to live ("TTL") of 63 implying that the conference is bounded within the region (field 642); (vii) record "b" which specifies the bandwidth of the session (field 644); (viii) record "a" which specifies the dynamic payload type used (field 646) and details of the codec used including the clock rate (field 648) (e.g., G.729 codec with a clock rate of 8000 Hz); and (ix) record "a" which specifies that the terminal can send and receive on the RTP session (field 650) (i.e., this RTP session uses social control).

FIG. 7 illustrates a second exemplary SDP announcement 700 of the present invention. In particular, the exemplary announcement 700 illustrates an announcement for distance learning that is multicast in two languages. Before the start of the conference, terminals may negotiate their capabilities with a capability negotiation server. During the conference, terminals are allowed to join the panel using the MC address provided in the announcement. It must be noted that the announcement has the capability negotiation server and the MC as the same machine. If a MCU instead of a MC is used, then within the panel the media is centralized and outside the panel the media is multicast. Also, the MCU provides the mixed audio and the video of the focus to all the terminals. If a MC is used, then chair-control can be used to allow media from one terminal at a time. Note that the public announcement of FIG. 7 neither contains the MC address nor the encryption keys. This extra information is part of the private announcement, as shown in FIG. 8.

Referring to FIG. 7, the public announcement records "v", "o", "s", "t", and "r" are the same as those specified in the accompanying description of FIG. 6. In addition to these records, the public announcement 700 includes (i) record "u" which specifies a web site for details about the conference (field 702) (e.g., a class); (ii) record "k" which specifies a web site for the private announcement (field 704); and (iii) record "a" which specifies the conference type (field 706) (e.g., a H.332 loosely-coupled conference).

The public announcement further includes control record set 708 for capability negotiation. The control records set 708 include record "m" (field 710) which includes the media type (e.g., control to specify external control), the transport port (e.g., 1720), the transport protocol (e.g., H.323), and the media format (e.g., capability negotiation) and record "c" (field 712) which includes the network type (e.g., Internet), the address type, and the capability negotiation server call-signaling address.

The audio RTP/RTCP session record set 714 includes (i) record "m" (field 716) which specifies an audio RTP session, a RTP port of 5004, a RTCP port of 5005, Audio Video Profile ("AVP"), and a static payload type (e.g., 4 for G723.1); (ii) record "i" (field 718) which specifies that the RTP session is in English; (iii) record "c" (field 720) which specifies, among other things, the multicast address for the connection; (iv) record "b" (field 722) which specifies the bandwidth of the RTP session (e.g., 5.6 kb/s); and (v) record "a" (field 724) which specifies that the audio session is receive only on this RTP session when outside the panel. A second audio RTP/RTCP session record set 726 is provided in a different language (e.g., Hindi).

The video RTP/RTCP session record set 728 includes (i) record "m" (field 730) which specifies a video RTP session, a RTP port of 5008, a RTCP port of 5009, AVP is used, and a dynamic payload type for H.263; (ii) record "c" (field 732) which specifies, among other things, the multicast address for connection and a TTL of 127 which implies that the class is open to all in the world; (iii) record "b" (field (734) which specifies the bandwidth of the RTP session used (e.g., 16 kb/s); (iv) record "a" (field 736) which specifies that a dynamic payload type of 100 is used and the details of the codec (e.g., H.263 having a clock rate of 90000 Hz) and (vi) record "a" (field 738) which specifies that the RTP session is receive only outside of the panel.

FIG. 8 illustrates an exemplary private announcement of the present invention. The private announcement differs from the public announcement in that it has the MC address, the encryption algorithm, and the key. In this description, only the records that are new are explained. Referring to FIG. 8, record "k" (field 802) specifies the encryption algorithm and key in base 64 encoding that is used. The private announcement further includes control record set 804 for back-channel so that a RTP receiver terminal may join the panel. The record "m" (field 806) specifies the media type (e.g., control for external control), the transport port, the transport protocol, and the media format (e.g., "mc"). The record "c" (field 808) specifies, among other things, the MC's call-signaling address for connection during the conference.

As can be seen from the aforementioned description and accompanying Figures, the present invention provides a mechanism to throttle connections to a MC in a loosely-coupled conference potentially involving hundreds and thousands of participants. This mechanism regulates the connections from the RTP receiver terminals and provides scalability well beyond the limits of H.323. Accordingly, the present invention provides a great advantage over H.323 in that the present invention, for example, can support virtual classrooms having an unlimited number of participants located at an unlimited number of remote places.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. In a loosely-coupled conference that includes at least one receiver terminal and a H.323 panel having a multipoint controller and one or more H.323 terminals coupled to the multipoint controller and each to transmit and receive media streams on a multicast address, a method of throttling connections to the multipoint controller, comprising the steps of:
    a) receiving a callable address of a receiver terminal on the multicast address;
    b) determining whether sufficient resources are available to allow the receiver terminal to join the panel; and
    c) connecting to the receiver terminal using the callable address and allowing the receiver terminal to join the H.323 panel and transmit and receive the media streams on the multicast address if the sufficient resources are available.

2. The method of claim 1 further comprising the step of the receiving a plurality of callable addresses from a plurality of receiver terminals who want to join the H.323 panel to transmit the media streams.

3. The method of claim 1 further comprising the step of d) causing the receiver terminal to leave the H.323 panel and simultaneously receive the media streams on the multicast address when the sufficient resources are not available.

4. The method of claim 1 wherein step c) includes the step of connecting to the receiver terminal using the callable address and allowing the receiver terminal to join the H.323 panel and transmit and receive audio and alternatively video streams between the one or more H.323 terminals.

5. In a system that includes at least one receiver terminal and a H.323 panel having a multipoint controller and one or more H.323 terminals coupled to the multipoint controller and each to transmit and receive media streams on a multicast address, the multipoint controller comprising:
    a first circuit to receive a callable address of a receiver terminal on the multicast address;
    a second circuit to determine whether sufficient resources are available to allow the receiver terminal to join the H.323 panel; and
    a third circuit to allow the receiver terminal to join the H.323 panel and transmit and receive the media streams between the one or more H.323 terminals if the sufficient resources are available.

6. The multipoint controller of claim 5 further comprising a fourth circuit to cause the receiver terminal to leave the H.323 panel and simultaneously receive the media streams of the one or more H.323 terminals.

7. The multipoint controller of claim 5 wherein the media streams includes an audio stream and alternatively a video stream.

8. In a system that includes at least one receiver terminal and a H.323 panel having a multipoint controller and one or more H.323 terminals coupled to the multipoint controller and each to transmit and receive media streams on a multicast address, the multipoint controller comprising:
    a processor; and
    a memory coupled to said processor, said memory to contain instructions to be executed by said processor to (i) receive a callable address of a receiver terminal on the multicast address, (ii) determine whether sufficient resources are available to allow the receiver terminal to join the H.323 panel, and (iii) allow the receiver terminal to join the H.323 panel and transmit and receive the media streams on the multicast address for establishing bi-directional communication with the one or more H.323 terminals if the sufficient resources are available.

9. The multipoint controller of claim 8 wherein the memory is to further contain instructions to cause the receiver terminal to leave the H.323 panel and simultaneously receive the media streams of the one or more H.323 terminals when the sufficient resources are not available.

10. The multipoint controller of claim 8 wherein the memory is to further contain instructions to cause the multipoint controller to receive a plurality of callable addresses of a plurality of receiver terminals and allow the plurality of receiver terminals to join the H.323 panel if the sufficient resources are available.

11. The multipoint controller of claim 8 wherein the media streams includes an audio stream and alternatively a video stream.

12. In a loosely-coupled conference that includes at least one receiver terminal and a H.323 panel having a multipoint controller with a multipoint address and one or more H.323 terminals coupled to the multipoint controller and each to transmit and receive media streams on a multicast address, a method of throttling connections to the multipoint controller, comprising the steps of:

a) transmitting the multipoint address on the multicast address if the multipoint controller has sufficient resources to allow a receiver terminal to join the H.323 panel;

b) connecting to the receiver terminal when the same uses the multipoint address to connect to the multipoint controller and allowing the receiver terminal to join the H.323 panel to transmit and receive the media streams on the multicast address; and c) preventing the multipoint address to be transmitted on the multicast address if the multipoint controller does not have the sufficient resources to allow more receiver terminals to join the H.323 panel.

13. The method of claim 12 further comprising the step of:

d) removing the receiver terminal from the H.323 panel and terminating its ability to transmit the media streams on the multicast address if the sufficient resources are not available.

14. In a loosely-coupled conference that includes at least one receiver terminal and a H.323 panel having a multipoint controller unit ("MCU") to transmit media streams on a multicast address and one or more H.323 terminals coupled to the MCU to each transmit and receive the media streams to the MCU, a method of throttling connections to the MCU, comprising the steps of:

a) receiving a callable address of a receiver terminal on the multicast address;

b) determining whether sufficient resources are available to allow the receiver terminal to join the H.323 panel; and c) connecting to the receiver terminal using the callable address and allowing the receiver terminal to join the H.323 panel and transmit and receive the media streams on the multicast address if the sufficient resources are available.

15. The method of claim 14 further comprising the step of receiving a plurality of callable addresses from a plurality of receiver terminals who want to join the H.323 panel.

16. The method of claim 14 further comprising the step of d) causing the receiver terminal to leave the H.323 panel and simultaneously receive the media streams on the multicast address when the sufficient resources are not available.

17. The method of claim 14 wherein step c) includes the step of connecting to the receiver terminal using the callable address and allowing the receiver terminal to join the H.323 panel and transmit and receive audio and alternatively video streams between the one or more H.323 terminals.

18. In a loosely-coupled conference that includes at least one receiver terminal and a H.323 panel having a multipoint controller unit ("MCU") to transmit media streams on a multicast address and one or more H.323 terminals coupled to the MCU to each transmit and receive the media streams to the MCU, a MCU comprising:

a processor; and a memory coupled to said processor, said memory to contain instructions to be executed by said processor to (i) receive a callable address of a receiver terminal on the multicast address, (ii) determine whether sufficient resources are available to allow the receiver terminal to join the H.323 panel, and (iii) allow the receiver terminal to join the H.323 panel and transmit and receive the media streams on the multicast address for establishing bi-directional communication with the one or more H.323 terminals if the sufficient resources are available.

19. The MCU of claim 18 wherein the memory is to further contain instructions to cause the receiver terminal to leave the H.323 panel when the sufficient resources are not available.

20. In a loosely-coupled conference that includes at least one receiver terminal and a H.323 panel having a multipoint controller unit ("MCU") with a multipoint address to transmit media streams on a multicast address and one or more H.323 terminals coupled to the MCU to each transmit and receive the media streams to the MCU, a method of throttling connections to the MCU, comprising the steps of:

a) transmitting the multipoint address on the multicast address if the MCU has sufficient resources to allow a receiver terminal to join the H.323 panel;

b) connecting to the receiver terminal when the same uses the multipoint address to connect the MCU and allowing the receiver terminal to join the H.323 panel to transmit and receive the media streams on the multicast address; and c) preventing the multipoint address to be transmitted on the multicast address if the MCU does not have the sufficient resources to allow more receiver terminals to join the H.323 panel.

* * * * *